(12) United States Patent
Kiadeh et al.

(10) Patent No.: US 8,552,704 B2
(45) Date of Patent: Oct. 8, 2013

(54) CURRENT SHARE COMPENSATION DESIGN

(75) Inventors: Mansur Kiadeh, Cupertino, CA (US);
Paul Walker Latham, II, Lee, NH (US);
Maria-Silvia Ratto, Trezzano (IT);
Paolo Luigi Tronconi, Rozzano (IT);
Stewart Gall Kenly, Epping, NH (US)

(73) Assignee: Maxim Integrated Products, Inc., San Jose, CA (US)

( * ) Notice: Subject to any disclaimer, the term of this patent is extended or adjusted under 35 U.S.C. 154(b) by 315 days.

(21) Appl. No.: 13/080,017

(22) Filed: Apr. 5, 2011

(65) Prior Publication Data

US 2012/0256659 A1 Oct. 11, 2012

(51) Int. Cl.
*G05F 1/40* (2006.01)

(52) U.S. Cl.
USPC .......................................... 323/285; 363/72

(58) Field of Classification Search
USPC ................ 323/222, 224, 266–267, 272, 275,
323/282–290; 363/16–17, 21.02, 21.18, 41,
363/61, 65, 89, 98, 132; 307/43, 64–66, 52,
307/67, 105, 102, 110
See application file for complete search history.

(56) References Cited

U.S. PATENT DOCUMENTS

| | | | | |
|---|---|---|---|---|
| 5,757,099 | A * | 5/1998 | Cheng et al. | 307/105 |
| 6,144,194 | A * | 11/2000 | Varga | 323/285 |
| 6,414,469 | B1 * | 7/2002 | Zhou et al. | 323/272 |
| 6,495,995 | B2 * | 12/2002 | Groom et al. | 323/283 |
| 6,850,045 | B2 * | 2/2005 | Muratov et al. | 323/272 |
| 7,502,240 | B2 * | 3/2009 | Leung et al. | 363/72 |
| 7,688,608 | B2 * | 3/2010 | Oettinger et al. | 363/132 |

OTHER PUBLICATIONS

Zhang, Y. et al., "Current Sharing in Digitally Controlled Masterless Multi-phase DC-DC Converters", Power Electronics Specialists Conference, Jun. 2005, PESC '05 IEEE 36th, 10.1109/PESC.2005.1582018, pp. 2722-2728.

Ozkaynak, I., "Modeling and Design of n+1 Current Share as Disturbance Rejection for DC-DC Converters", 2005, Senior Member IEEE Power Supply Consultants.

Panov, Y. et al., "Loop Gain Measurement for Paralleled DC-DC Converters With Average-Current-Sharing Control", 2008, IEEE Transactions on Power Electronics. vol. 23, No. 6., pp. 2942-2948.

Lin, C S. et al., Single-Wire Current-Share Paralleling of Current-Mode Controlled DC Power Supplies, 2000, IEEE Transaction on Industrial Electronics, vol. 47., No. 4, pp. 780-786.

* cited by examiner

Primary Examiner — Rajnikant Patel

(57) ABSTRACT

A current share system for providing current to a load includes a first power supply module that controls a first voltage converter to provide a first current to the load, that transmits synchronization information using a first pin, and that transmits at least one second type of information using the first pin. A second power supply module receives the synchronization information at a second pin, receives the at least one second type of information at the second pin, and controls a second voltage converter to provide a second current to the load based on the synchronization information and the at least one second type of information.

20 Claims, 4 Drawing Sheets

CURRENT SHARE COMPENSATION DESIGN

FIELD

The present disclosure relates to control systems for power supplies, and more particularly to systems and methods for current sharing between DC to DC converters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A power supply outputs a predetermined voltage that may be used to power one or more components. For example, the predetermined voltage may power one or more components of an integrated circuit (IC). In some situations, however, a voltage that is less than the predetermined voltage may be sufficient. The lower voltage may be obtained from the predetermined voltage using a voltage divider circuit. Voltage divider circuits, however, are inefficient and inaccurate.

The power supply may implement a DC to DC converter (such as a step-down, or "buck," converter) to provide the lower voltage. Under a given set of conditions, a buck converter is generally more efficient and more accurate than a voltage divider circuit. A buck converter may include an inductor, a capacitor, and two switches. The buck converter alternates between charging the inductor by connecting the inductor to the predetermined voltage and discharging the inductor to a load.

Two or more single phase power supplies may be stacked (i.e., provided in parallel) to minimize a required input capacitance, increase output power, reduce thermal stress, and lower inductor height. Each of the power supplies provides current during a respective phase.

SUMMARY

A current share system for providing current to a load includes a first power supply module that controls a first voltage converter to provide a first current to the load, that transmits synchronization information using a first pin, and that transmits at least one second type of information using the first pin. A second power supply module receives the synchronization information at a second pin, receives the at least one second type of information at the second pin, and controls a second voltage converter to provide a second current to the load based on the synchronization information and the at least one second type of information.

In other features, a digital signal includes the synchronization information and the at least one second type of information. The second type of information includes at least one of current sharing information, duty cycle information, and commands. The second type of information includes duty cycle information, and the second power supply module adjusts a duty cycle of the second voltage converter based on the duty cycle information. The synchronization information includes synchronization pulses and the second type of information includes a frame of data. The frame of data is transmitted using consecutive ones of the synchronization pulses.

In other features, at least one second type of information includes current sharing information corresponding to the first current. The second power supply module receives the current sharing information, receives a signal corresponding to the second current, and adjusts the second current based on the current sharing information and the signal. The second power supply module adjusts the second current further based on an output stage resonance frequency of the current share system. The second power supply module includes a proportional-integral (PI) control module that adjusts the second current, and a proportional gain of the PI control module is selected such that a zero of the PI control module matches an output stage resonance frequency of the current share system. To simplify the design of the PI controller, an integral gain of the PI control module is set to 1.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
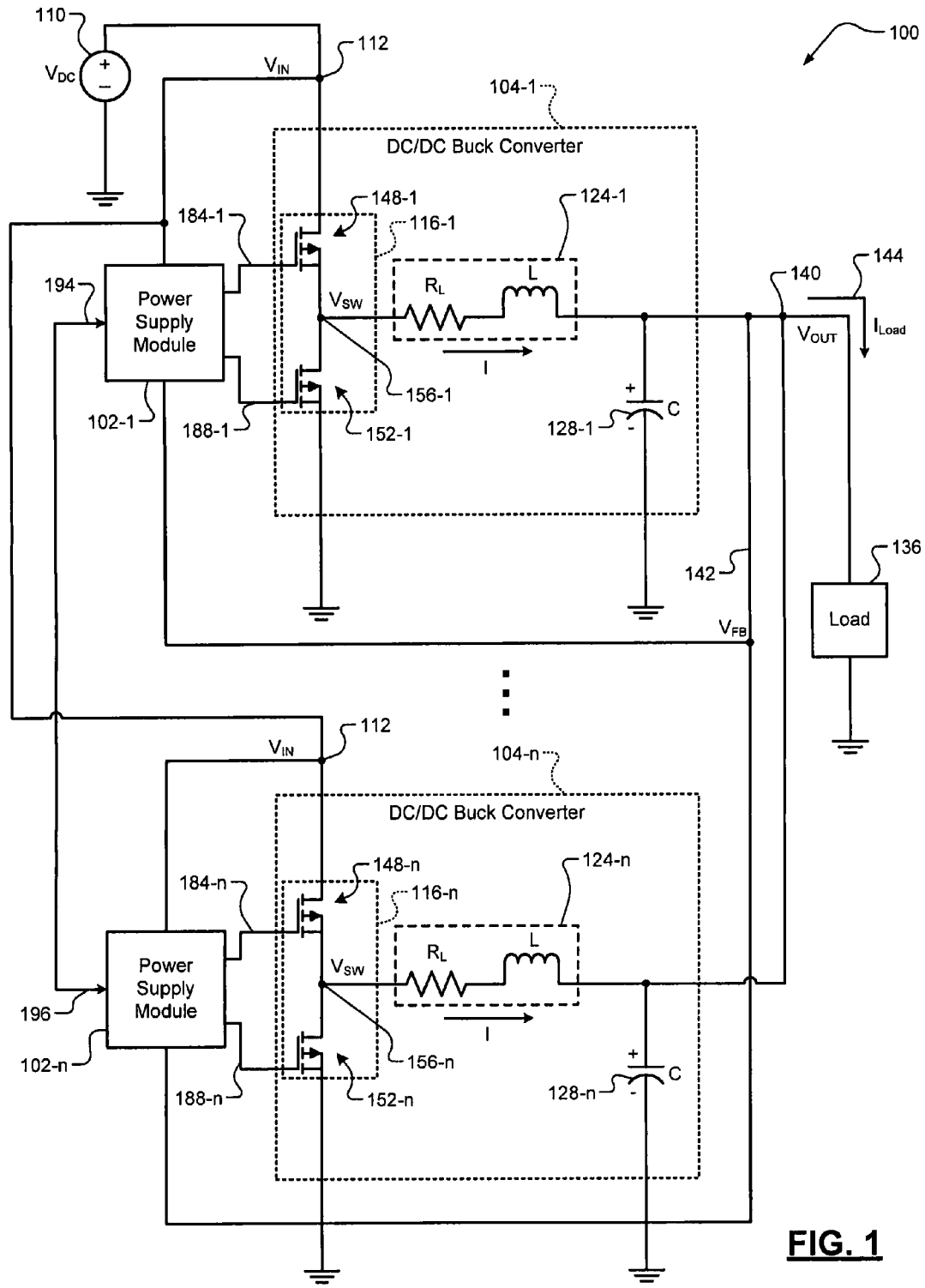
FIG. 1 is a functional block diagram of an example current share system including DC to DC buck converters according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Two or more single phase power supplies may be stacked such that each power supply provides current during a respective phase. In other words, the power supplies operate in a current sharing mode. In the current sharing mode, current and power provided to a common load are shared amongst the power supplies.

Each of the power supplies may have different operating characteristics that prevent current from being equally shared amongst the power supplies, resulting in a current imbalance. For example only, variations in component tolerances, offsets, environmental conditions, and connections between the power supplies and the common load may cause variations between the currents provided in each phase, and consequently cause the current imbalance.

A current share system of the present disclosure implements a synchronization (sync) control module that communicates with each of the power supplies in a current share arrangement. For example only, one or more of the power supplies may include the sync control module. One of the power supplies including the sync control module may be a master power supply module and the remaining power supplies may be slave power supply modules. The master power supply module uses the sync control module to transmit information to the slave power supply modules. The information may include, but is not limited to, sync information, current sharing information, duty cycle information, and commands. Each of the slave power supply modules may correct any current offset or imbalance between the master power supply module and the slave power supply modules based on the information.

Referring now to FIG. 1, an example implementation of a current share system 100 is shown. Although the current share system is shown implementing DC to DC buck converters, other suitable converters may be used. For example only, the current share system may implement a voltage regulator module (VRM) or a linear regulator. The current share system 100 includes power supply modules 102, including a master power supply module 102-1 and n slave power supply modules 102-$n$, where n is greater than 0 and the current share system provides current in n+1 phases. Each of the power supply modules 102 corresponds to a different one of the n+1 phases. For example only, the master power supply module 102-1 provides current to a buck converter 104-1 during a first phase and the slave power supply module 102-$n$ provides current to a buck converter 104-$n$ during an (n+1)th phase.

A DC power source 110 inputs DC power to the power supply modules 102 and the buck converters 104. A voltage input to the buck converters 104 will be referred to as an input voltage ($V_{IN}$) 112. The buck converters 104 may each include a switching module 116 (e.g. 116-1 and 116-$n$), an inductor 124 having an inductance L and a DC resistance $R_L$ (e.g. 124-1 and 124-$n$), and a capacitor (C) 128 (e.g. 128-1 and 128-$n$). Alternatively, the buck converters 104 may function with a single common capacitor (not shown) instead of the capacitors 128-1 and 128-$n$. The buck converters 104 output DC power to a common load 136. The voltage output by the buck converters 104 may be provided as an output voltage ($V_{OUT}$) 140, which may be provided as a feedback voltage ($V_{FB}$) 142 to each of the power supply modules 102. The current through the load 136 will be referred to as a load current ($I_{LOAD}$) 144. The master power supply module 102-1 may function with an optional external oscillator (not shown).

Each of the switching modules 116 includes a first switch 148 (e.g. 148-1 and 148-$n$) and a second switch 152 (e.g. 152-1 and 152-$n$). For example only, the first and second switches 148 and 152 may be field effect transistors (FETs) as shown in the example of FIG. 1. In various implementations, such as in the example of FIG. 1, the first and second switches 148 and 152 may be p-type, enhancement FETs. The first and/or the second switch 148 and 152 may be another suitable type of switch.

In the example of FIG. 1, a source terminal of the first switch 148 is connected to the input voltage 112, and a drain terminal of the first switch 148 is connected to a source terminal of the second switch 152. The drain terminal of the second switch 152 is connected to ground. A first end of the inductor 124 is connected to a node 156 between the drain terminal of the first switch 148 and the source terminal of the second switch 152. A voltage at the node 156 (e.g. 156-1 and 156-$n$) will be referred to as a switching voltage ($V_{SW}$). A second end of the inductor 124 is connected to a first end of the capacitor 128. A second end of the capacitor 128 may be connected to ground.

The feedback voltage 142 may be measured at a node between the inductor 124 and the capacitor 128. The switching module 116 controls connection and disconnection of the inductor 124 and the input voltage 112. Gate terminals of the first and second switches 148 and 152 are connected to the power supply modules 102. The power supply modules 102 control operation of the first and second switches 148 and 152. The power supply modules 102 control first and second switches 148 and 152 using pulse width modulation (PWM). More specifically, the power supply modules 102 generate first and second PWM signals 184 (e.g. 184-1 and 184-$n$) and 188 (188-1 and 188-$n$) that are applied to the gate terminals of the first and second switches 148 and 152, respectively.

The power supply modules 102 vary the duty cycle of the first and second PWM signals 184 and 188 to control the output of the buck converters 104. The duty cycle of a signal may refer to a percentage of a predetermined period (e.g., a control loop) during which the signal is in an active state. For example only, the power supply modules 102 may monitor the feedback voltage 142 to control the first and second PWM signals 184 and 188 to maintain the output voltage 140 at approximately a predetermined (e.g., commanded or desired) voltage. The predetermined voltage is less than the input voltage 112.

The master power supply module 102-1 transmits information associated with the operation of the current share system 100 to the slave power supply module 102-$n$. For example, each of the power supply modules 102 controls a corresponding one of the buck converters 104 to provide a target current. However, in some instances, while the master power supply module 102-1 accurately provides the target current, the slave power supply module 102-$n$ may provide a current that is greater than or less than the target current, or offset from the target current. Accordingly, the information received from the master power supply module 102-1 allows the slave power supply module 102-$n$ to make control adjustments to provide a current consistent with the target current and the master power supply module 102-1.

For example only, the information transmitted to the slave power supply module 102-$n$ includes, but is not limited to, sync information, current sharing information, duty cycle information, and commands. For example only, the sync information may include a sync pulse to synchronize phases of the power supply modules 102. The current sharing information may indicate the target current, which may correspond to a current through the inductor 124-1 of the buck converter 104-1 (i.e. a master inductor current). The duty cycle information may include a commanded duty cycle. The commands may include power on and power off commands.

The master power supply module 102-1 transmits the information using a single pin 194 (e.g. over a single wire). More specifically, the master power supply module 102-1 transmits multiple types of information, such as the sync information, the current sharing information, the duty cycle information, and the commands, using the single pin 194. Similarly, the slave power supply module 102-n receives the multiple types of information using a single pin 196. The slave power supply module 102-n retrieves the sync information to synchronize control with the master power supply module 102-1.

For example only, the slave power supply module 102-n may respond to a sync pulse included in the information. Similarly, the slave power supply module 102-n retrieves the current sharing information, the duty cycle information, and the commands to adjust control of the buck converter 104-n accordingly. The presence of the connection between the single pins 196 and 194 may indicate to the slave power supply module 102-n that the slave power supply module 102-n is operating as a slave in a current share arrangement. For example only, the slave power supply module 102-n may detect the sync pulse on the pin 196 and determine that the slave power supply module 102-n is in the current share arrangement.

Figure 2:
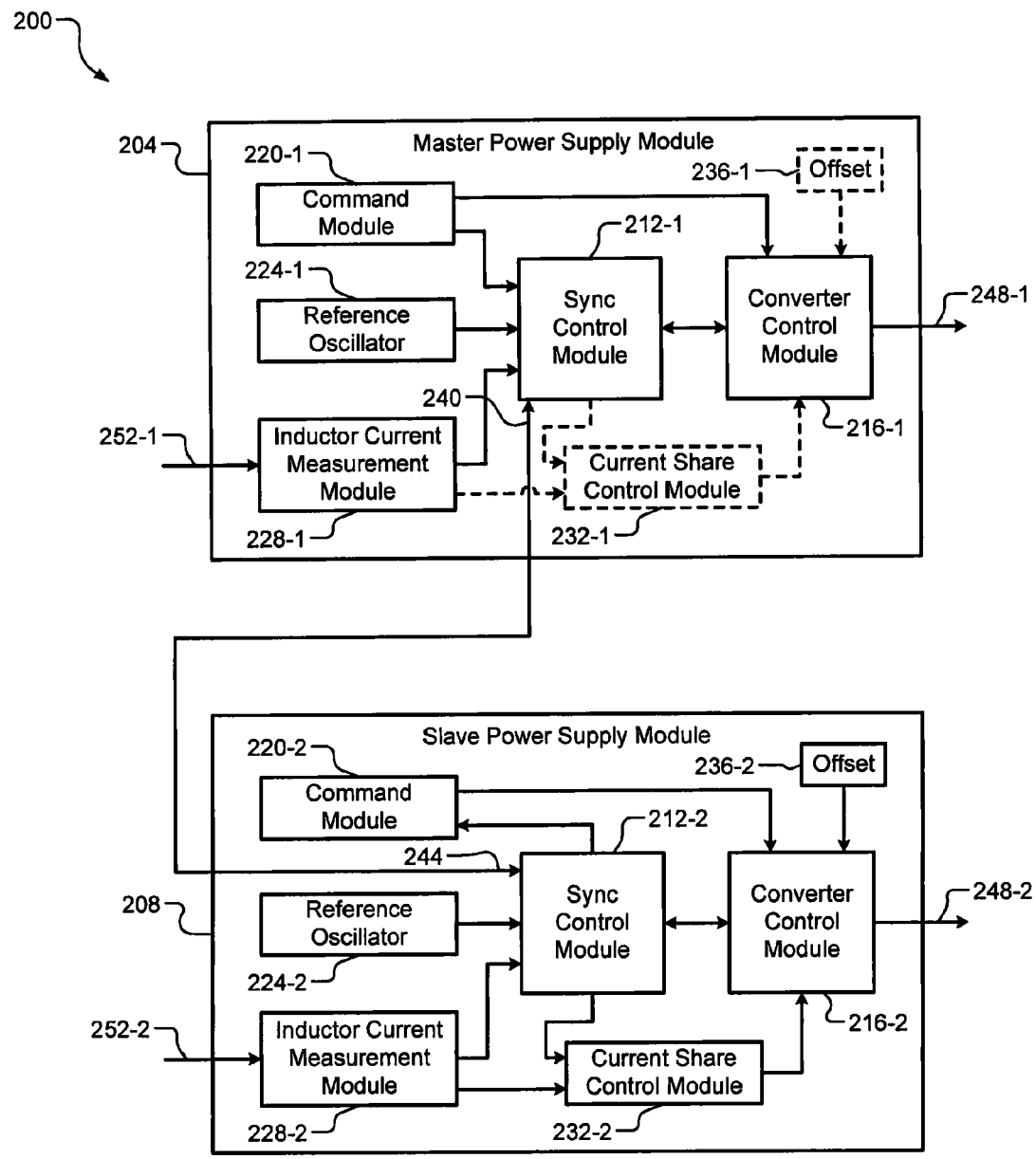
FIG. 2 is a functional block diagram of an example of current share system according to the present disclosure.

Referring now to FIG. 2, an example current share system 200 includes a master power supply module 204 and a slave power supply module 208 shown in further detail. Although as shown in FIG. 2 only a single slave power supply module 208 is shown (i.e. in a two phase arrangement), the current share system 200 may include any number of slave power supply modules. Each of the master power supply module 204 and the slave power supply module 208 includes: a sync control module 212 (e.g. 212-1 and 212-2); a converter control module 216 (e.g. 216-1 and 216-2); a command module 220 (e.g. 220-1 and 220-2); a reference oscillator 224 (e.g. 224-1 and 224-2); and an inductor current measurement module 228 (e.g. 228-1 and 228-2).

The master power supply module 204 and the slave power supply module 208 are shown to further include a current share control module 232 (e.g. 232-1 and 232-2), which is associated with operation as a slave in the current share system 200. The current share control module 232-2 updates the converter control module 216-2 with current sharing information received from the master power supply module 204. The slave power supply module 208 (and optionally, the master power supply module 204) may be programmed with or receive an offset 236 (e.g. 236-1 and 236-2). The offset 236 may correspond to a user calibrated or manufacturer selected phase delay of the slave power supply module 208 with respect to the master power supply module 204. In other words, the offset 236 may correspond to a potential offset between the circuitry of the master power supply module 204 and the slave power supply module 208, and may reflect how quickly and efficiently the current share control module 232-2 removes any offset and balances the currents.

Only the current share control module 232-2 and the offset 236-2 of the slave power supply module 208 may be active in the current share system 200 as shown. However, it is to be understood that the master power supply module 204 may still include the current share control module 232-1 and receive the offset 236-1. For example only, the master power supply module 204 may be configured to operate as a slave in another current share arrangement. Conversely, the slave power supply module 208 may be configured to operate as a master in another current share arrangement.

Accordingly, the master power supply module 204 may include any necessary components configured for operating as a slave, and the slave power supply module 208 may include any necessary components configured for operating as a master. As such, the master power supply module 204 and the slave power supply module 208 may be interchangeable.

The sync control module 212-1 communicates with the sync control module 212-2 to provide information to the slave power supply module 208. For example only, the sync control module 212-1 serially transmits information such as sync information, current sharing information, duty cycle information, and commands using a single pin or wire 240. The sync control module 212-2 serially receives the information using a single pin or wire 244. For example only, each of the sync control modules 212-1 and 212-2 may implement a transmitter and receiver (i.e. a transceiver) for both transmitting and receiving information.

The converter control modules 216 each control operation of a respective converter (for example only, a respective one of the converters 104 as shown in FIG. 1). For example only, the converter control modules 216 control operation of the respective converters 104 using signals 248 (e.g. 248-1 and 248-2), each of which may correspond to the signals 184 and 188 as shown in FIG. 1. Each of the converter control modules 216 may include PWM time base modules, PLLs, and/or other circuitry (not shown) associated with PWM control of the converters 104.

The sync information allows the phases of the master power supply module 204 and the slave power supply module 208 to be synchronized. For example only, it may desirable for operation of the master power supply module 204 and the slave power supply module 208 to begin at the same time so that the respective phases of the power supply modules 204 and 208 are aligned. Accordingly, the sync information may include a sync pulse that indicates to the slave power supply module 208 when to begin operation of the converter control module 216-2. For example only, during or after an initial power up, the sync control module 212-1 transmits the sync pulse to the sync control module 212-2, and each of the master power supply module 204 and the slave power supply module 208 begin operation of the respective converter control modules 216-1 and 216-2 according to the sync pulse.

In addition to the sync pulse, the sync control module 212-1 transmits at least one second type of information to the sync control module 212-2 using the same single wire 240. The second type of information may include, but is not limited to, the current share information, the duty cycle information, and the commands. For example only, the second type of information is digital data implementing the same digital signal structure as the sync pulse. In other words, if the sync pulse uses a square wave digital signal (e.g. the sync pulse is a single square wave bit), then the second type of information is implemented using a square wave digital signal having the same bit characteristics as the sync pulse. For example only, the second type of information may include packetized data (i.e. a frame of data) that is transmitted after the sync pulse or in between consecutive sync pulses.

The digital data transmitted from the sync control module 212-1 to the sync control module 212-2 may indicate which data corresponds to the sync pulse and which data corresponds to the second type of information. For example only, the sync pulse may follow a predetermined sequence of bits (e.g. a predetermined number of 1's or 0's). A frame of data including any of the second type of information may immediately follow the sync pulse. After the frame of data is transmitted, the predetermined sequence of bits may be transmitted again to indicate another upcoming sync pulse. It is to be understood that other suitable multiple access schemes may be used to integrate the transmission of the sync pulse and the second type of information using the same wire 240.

Each frame of data may include the current sharing information, the duty cycle information, and/or the commands. Alternatively, a first frame of data transmitted after a first sync pulse may include the current sharing information, a second frame of data transmitted after a second sync pulse may include the duty cycle information, and a third frame of data transmitted after a third sync pulse may include the commands. Some of the information (such us the current sharing information) may be transmitted after every sync pulse, while other information (such as the duty cycle information and/or the commands) may be transmitted only when an update is desired. In some situations, no information other than the sync pulse may be transmitted. In other situations, only the duty cycle information, the current sharing information, and/or the commands may be transmitted. The sync control module 212-1 may transmit one frame of data per PWM cycle of the power supply modules 204 and 208.

The sync control module 212-2 updates a duty cycle of the converter control module 216-2 according to the duty cycle information. Further, the sync control module 212-2 receives any of the commands transmitted from the sync control module 212-1 and process the commands accordingly. For example, the command module 220-1 of the master power supply module 204 may transmit the commands to the sync control module 212-1, which in turn transmits the commands to the sync control module 212-2. The sync control module 212-2 transmits the commands to the command module 220-2. The commands may include, but are not limited to, a hard shutdown command, a soft shutdown or reset command, a run command, and an adaptive calibration command.

Each of the power supply modules 204 and 208 further controls operation of the respective converter control modules 216 based on information received from the inductor current measurement modules 228. For example, in the master power supply module 204, the inductor current measurement module 228-1 receives an inductor current signal 252-1, which represents a current through the inductor 124-1 (as shown in FIG. 1). The master power supply module 204 may control the converter control module 216-1 to adjust the current through the inductor 124-1 based on the information received from the inductor current measurement module 228-1. The sync control module 212-1 also transmits the information received from the inductor current measurement module 228-1 to the sync control module 212-2 as the current sharing information. Accordingly, the sync control module 212-2 is updated with the current output from the master power supply module 204.

Similarly, in the slave power supply module 208, the inductor current measurement module 228-2 receives an inductor current signal 252-2, which represents a current through the inductor 124-2 (as shown in FIG. 1). The current share control module 232-2 receives both the information received from the inductor current measurement module 228-2, as well as the inductor current measurement module 228-1 via the sync control module 212-2. In other words, because the sync control module 212-1 transmits the current sharing information to the sync control module 212-2, the current share control module 232-2 receives information regarding the current outputs of both the master power supply module 204 and the slave power supply module 208 (i.e. the currents through each of the inductors 124). Accordingly, the slave power supply module 208, using the current share control module 232-2, may control the converter control module 216-2 to adjust the current through the inductor 124-1 based in part on the current output of the master power supply module 204.

Figure 3:
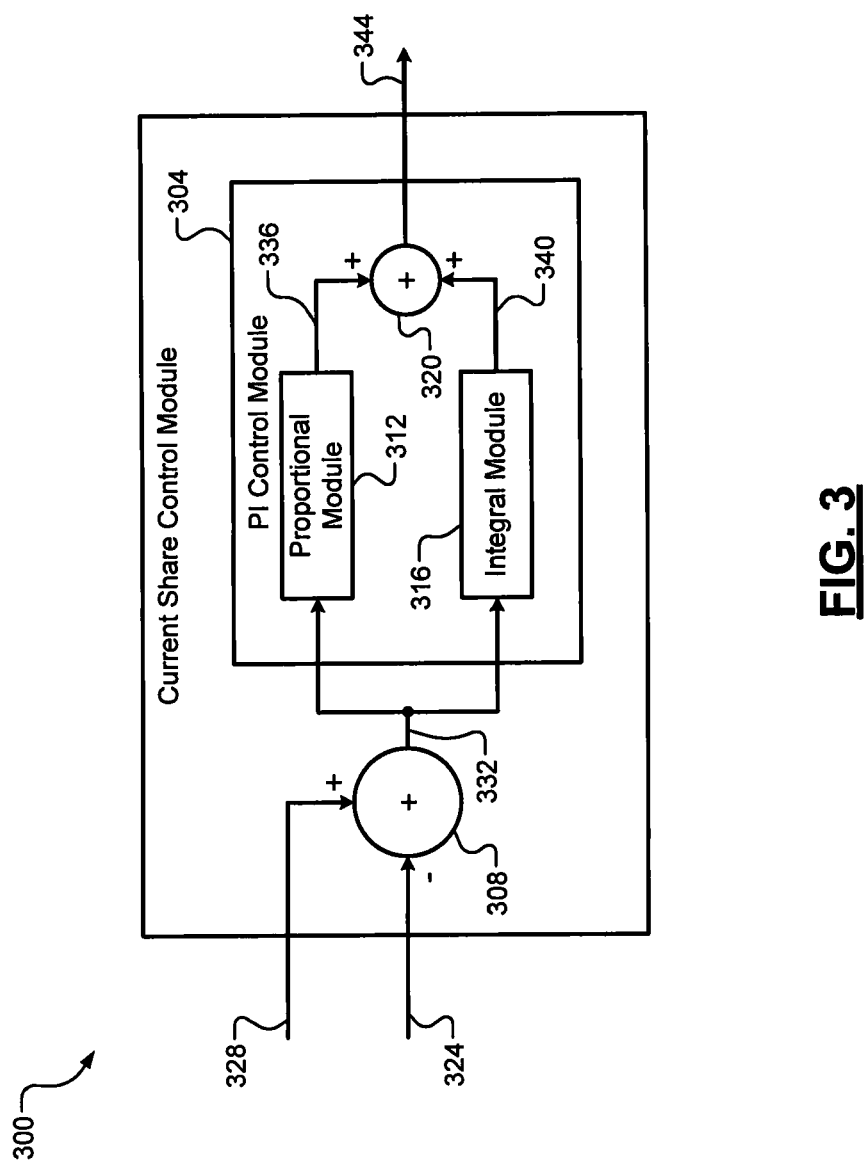
FIG. 3 is a functional block diagram of an example current share control module according to the present disclosure.

Referring now to FIG. 3, an example current share control module 300 is shown. The current share control module 300 may implement a high speed proportional-integral (PI) control scheme to reduce any imbalance between the current outputs of the master power supply module 204 and the slave power supply module 208 during transient conditions (e.g. a master inductor current and a slave inductor current). Further, the current share control module 300 may implement the PI control scheme to reduce any effects of output stage resonance frequency during the transient conditions.

The current share control module 300 includes a PI control module 304 and a summing module 308. The PI control module 304 includes a proportional module 312, an integral module 316, and a summing module 320. The summing module 308 receives a slave inductor current 324 and a master inductor current 328. For example only, the received slave inductor current 324 may be a first voltage $V_{ind}$ that represents the slave inductor current and the received master inductor current 328 may be a second voltage $V_{target}$ that represents the master inductor current. The received master inductor current 328 corresponds to a target inductor current of the slave power supply module 208. The summing module 320 outputs a difference (i.e. error) 332 between the slave inductor current 324 and the master inductor current 328. For example only, a voltage $V_e$ corresponds to the error 332.

Each of the proportional module 312 and the integral module 316 receives the error 332. The proportional module 312 and the integral module 316 calculate and output a proportional term 336 and an integral term 340, respectively, based on the error 332. The summing module 320 sums the proportional term 336 and the integral term 340 and outputs a current share correction 344 accordingly. For example only, a voltage $V_{share}$ corresponds to the current share correction 344. The current share correction 344 corresponds to an output of the current share control module 232-2 as shown in FIG. 2.

The PI control module 304 updates the current share correction 344 at a rate that is limited only by characteristics of the output stages (i.e. the converters 104) and a sampling rate of the current share system 200 (e.g. sampling rates of the inductor current measurement modules 228). For example only, the current sharing information including the master inductor current 328 may be provided at every PWM cycle of the power supply modules 204 and 208.

In the PI control module 304 of the present disclosure, coefficients of the PI control module 304 are selected based on information provided via the current sharing information. In other words, the slave inductor current 324 and the master inductor current 328 provide information regarding the output stages of the master power supply module 204 and the slave power supply module 208. For example only, characteristics of the PI control module 304 may be matched to an output stage resonance frequency of the converters 104. Consequently, effects of the output stage resonance frequency are reduced and the transient response is smoothed.

For example only, a zero $z_i$ of the PI control module 304 is selected to match (i.e. sit on top of) the output stage resonance frequency and a pole of the PI control module 304. Accordingly, a gain $kp_{share}$ of the proportional module 312 is selected such that the zero $z_i$ of the PI control module 304 matches the output stage resonance frequency. A gain $ki_{share}$ of the integral module 316 can be set to 1 to simplify both calculations and hardware implementation of the PI control module 304.

For example, where $$\frac{V_{share}}{V_e} = \frac{kp_{share}(z - z_i)}{z - 1},$$

$z_i$ can be isolated according to $$z_i = \frac{(kp_{share} - ki_{share})}{kp_{share}}.$$

A desired value of $z_i$ is determined based on the output stage resonance frequency $wT_{share}$. The resonance frequency $wT_{share}$ is calculated according to a sampling period that corresponds to a PWM period $T_{PWM}$ of both the master power supply module 204 and the slave power supply module 208, an output inductance L, and an output capacitance C. Accordingly, $$wT_{share} = \frac{(2 \times T_{PWM})}{\sqrt{LC}},$$

and $z_i$ is selected to match $wT_{share}$. With the desired value of $z_i$ known and the gain $ki_{share}$ of the integral module 316 set to 1, $kp_{share}$ can be further simplified according to $$kp_{share} = \frac{1}{1 - z_i}.$$

Consequently, the gain $kp_{share}$ of the proportional module 312 can be set to match the zero $z_i$ of the PI control module 304 to the output stage resonance frequency $wT_{share}$.

Figure 4:
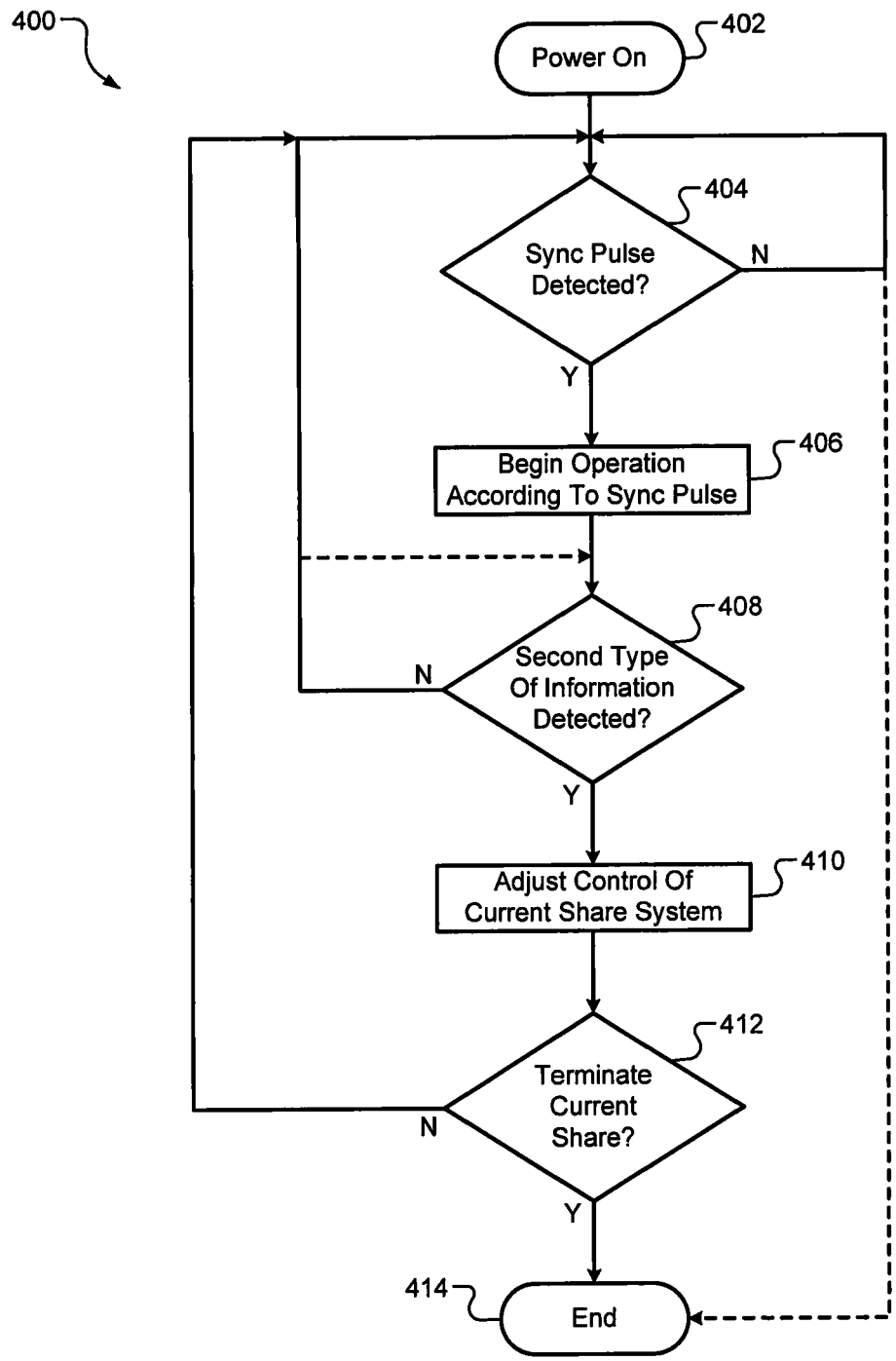
FIG. 4 is a flowchart illustrating steps of an example current share method according to the present disclosure.

Referring now to FIG. 4, an example current share method 400 begins at 402. For example only, the method 400 may power on the current share system 200 as shown in FIG. 2. At 404, the method 400 determines whether a sync pulse is detected. If true, the method 400 continues with 406. If false, the method 400 repeats 404 to continue determining whether a sync pulse is detected. Alternatively, the method 400 may determine that a corresponding power supply module is not in a current share arrangement if no sync pulse is detected in a predetermined period, and terminate the method 400. At 406, the method 400 beings operation according to the sync pulse.

At 408, the method 400 determines whether any of a second type of information is detected. For example only, the method 400 determines whether current sharing information, duty cycle information, and/or commands are detected. If true, the method 400 continues with 410. If false, the method 400 continues with 404. Alternatively, the method 400 may repeat 408 to continue to determine whether any of the second type of information is detected for a predetermined period before returning to 404. At 410, the method 400 adjusts control of the current share system 200 based on the second type of information. For example, the method 400 may adjust a duty cycle based on the current sharing information and/or the duty cycle information. At 412, the method 400 determines whether to terminate the current share method 400. If true, the method 400 ends at 414. If false, the method 400 continues at 404 to detect a next sync pulse.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A current share system for providing current to a load, the current share system comprising:
    a first power supply module that controls a first voltage converter to provide a first current to the load, that transmits synchronization information using a first pin, and that transmits at least one second type of information using the first pin; and
    a second power supply module that receives the synchronization information at a second pin, that receives the at least one second type of information at the second pin, and that controls a second voltage converter to provide a second current to the load based on the synchronization information and the at least one second type of information.

2. The current share system of claim 1 wherein a digital signal includes the synchronization information and the at least one second type of information.

3. The current share system of claim 1 wherein the second type of information includes at least one of current sharing information, duty cycle information, and commands.

4. The current share system of claim 1 wherein the second type of information includes duty cycle information, and wherein the second power supply module adjusts a duty cycle of the second voltage converter based on the duty cycle information.

5. The current share system of claim 1 wherein the synchronization information includes synchronization pulses and the second type of information includes a frame of data.

6. The current share system of claim 5 wherein the frame of data is transmitted between consecutive ones of the synchronization pulses.

7. The current share system of claim 1 wherein:
    the at least one second type of information includes current sharing information corresponding to the first current; and
    the second power supply module receives the current sharing information, receives a signal corresponding to the second current, and adjusts the second current based on the current sharing information and the signal.

8. The current share system of claim 7 wherein the second power supply module adjusts the second current further based on an output stage resonance frequency of the current share system.

9. The current share system of claim 7 wherein the second power supply module includes a proportional-integral (PI) control module that adjusts the second current, and wherein a proportional gain of the PI control module is selected such that a zero of the PI control module matches an output stage resonance frequency of the current share system.

10. The current share system of claim 9 wherein an integral gain of the PI control module is set to 1.

11. A method for operating a current share system for providing current to a load, the method comprising:
    using a first power supply module, controlling a first voltage converter to provide a first current to the load;
    transmitting synchronization information using a first pin of the first power supply module;
    transmitting at least one second type of information using the first pin;

receiving the synchronization information at a second pin of a second power supply module;

receiving the at least one second type of information at the second pin; and using the second power supply module, controlling a second voltage converter to provide a second current to the load based on the synchronization information and the at least one second type of information.

12. The method of claim 11 wherein a digital signal includes the synchronization information and the at least one second type of information.

13. The method of claim 11 wherein the second type of information includes at least one of current sharing information, duty cycle information, and commands.

14. The method of claim 11 wherein the second type of information includes duty cycle information, and wherein the second power supply module adjusts a duty cycle of the second voltage converter based on the duty cycle information.

15. The method of claim 11 wherein the synchronization information includes synchronization pulses and the second type of information includes a frame of data.

16. The method of claim 15 further comprising transmitting the frame of data between consecutive ones of the synchronization pulses.

17. The method of claim 11 wherein the at least one second type of information includes current sharing information corresponding to the first current, and further comprising:

receiving the current sharing information using the second power supply module;

receiving a signal corresponding to the second current using the second power supply module; and adjusting the second current based on the current sharing information and the signal using the second power supply module.

18. The method of claim 17 further comprising adjusting the second current further based on an output stage resonance frequency of the current share system using the second power supply module.

19. The method of claim 17 wherein the second power supply module includes a proportional-integral (PI) control module, and further comprising:

adjusting the second current using the PI control module; and selecting a proportional gain of the PI control module such that a zero of the PI control module matches an output stage resonance frequency of the current share system.

20. The method of claim 19 further comprising setting an integral gain of the PI control module to 1.

* * * * *